Patented May 9, 1950

2,506,568

UNITED STATES PATENT OFFICE 2,506,568

STABILIZED IODIZED SALT AND PROCESS OF MAKING SAME

Paul V. Imes and Charles W. Jobes, Hutchinson, Kans., assignors to The Carey Salt Company, Hutchinson, Kans., a corporation of Kansas No Drawing. Application November 1, 1947, Serial No. 783,622

23 Claims. (Cl. 99—143)

This invention relates to stable iodized salt compositions and to an improved process for preparing such compositions.

The invention comprises new salt compositions containing pre-processed salt, such as table salt, with some of the particles of the pre-processed salt having a coating of a uniform mixture of an alkaline iodide and a stabilizer for the iodide, the coated and uncoated salt particles being uniformly mixed together. The invention also includes an improved process for preparing such new salt compositions by making up a uniform liquid mixture of the alkaline iodide and the stabilizer, spraying such mixture onto the pre-processed salt and mixing the sprayed and unsprayed salt particles. It also includes the use of a hydrated stabilizer such as a sulfite and the utilization of the water of crystallization thereof to dissolve the iodide for application to the salt and the property of the stabilizer to take back its water of crystallization to deposit the iodide and the stabilizer on the salt without tending to increase the tendency of the salt to cake.

It has previously been proposed to add a nontoxic alkaline iodide to dry mineral foods, such as table salt, for the purpose of incorporating into the diet a sufficient amount of available iodine to provide protection against common goiter, e. g., enlargement of the thyroid gland. It has also been proposed to incorporate into such an iodized composition, a stabilizer or reducing agent such as sodium thiosulphate, to prevent the iodide from being oxidized to free iodine, with consequent loss of the iodine content in the composition.

Heretofore, the iodine carrier, the stabilizer and the alkalinity control agent, if utilized, have been mixed together in their dry state and the resulting mixture has been physically admixed with a dry pre-processed salt, such as table salt.

Another method of preparing stable iodized salt compositions, which has been employed heretofore, includes the steps of making a water solution of the iodine carrier, stabilizer and alkalinity control agent, evaporating such solution to dryness, powdering the dry residue and admixing the powdered product with the dry pre-processed salt.

Utilizing such methods, considerable difficulty is encountered in obtaining or maintaining the desired degree of uniformity of iodine content in the stable iodized salt composition. These problems are particularly important because of the low percentage of alkaline iodide (usually about 0.01%) desired and allowable in the final product.

The relatively fine division of iodine carriers, such as potassium iodide, which is the iodide most widely used commercially, results in dusting or floating away of particles of the iodide during the mixing processes heretofore employed and also results in segregation of the components of stabilized salt compositions as heretofore prepared, thus increasing the difficulty of controlling and maintaining the iodine content in the final composition.

Another method of preparing iodized salt has been to prepare a saturated solution of the iodide and to deposit therein a small portion of the salt to be treated to get a deposit of the iodide thereon. The treated salt is then mixed with the larger remainder of the salt, using magnesium carbonate to take up the water and prevent caking if the water is not evaporated before mixture. This has involved the addition of a stabilizer as above set forth with its resultant problems such as those above set forth.

We have found that these difficulties can be entirely overcome and that a final product having a highly uniform iodine content, which is maintained during handling and storage, high stability and freedom from such caking as is brought on by adding water to the salt, may be prepared by spraying a moving mass or stream of pre-processed salt which is in a finely-divided form, such as table salt, with a liquid mixture consisting principally of potassium iodide and a stabilizer such as sodium thiosulphate, and containing only the water of crystallization or hydration of the stabilizer. This stabilized iodide solution is maintained at a temperature sufficiently above the recrystallization temperature of the stabilizer and is sprayed under pressure onto a constantly moving mass or stream of the pre-processed salt. Thus, the stabilizer-iodide mixture is deposited on crystals or particles of the pre-processed salt composition and forms a coating thereon. The salt composition is maintained at a suitable temperature for intermixing the crystals or particles thereof and for effecting prompt crystallization on particles thereof of a coating of the stabilized iodide solution, the water of crystallization being taken up by the stabilizer. It is usually desirable to incorporate with the pre-processed salt sufficient iodide to provide an iodide content in the final product of about 0.01%, and sufficient stabilizer should be included to stabilize the iodide throughout the periods of manufacture and storage of the iodized salt composition and to provide sufficient liquid in which the iodide may be dissolved.

As the stabilized iodide solution contains only the water of crystallization or hydration of the stabilizer such as hydrated sodium thiosulphate ($Na_2S_2O_3.5H_2O$), there is no dissolution of any of the salt particles during the formation of the stabilizer-iodide coating, and this coating is crystallized in situ on particles of the pre-processed salt composition so that such particles have the stabilizer-iodide mixture as a part of their physical make-up. The coated and uncoated particles in the mass or stream of salt composition are thoroughly intermixed, as for example by passing through a screw conveyor or other mixing device.

In accordance with this invention the uniform liquid mixture of iodide and stabilizer is deposited in the form of a coating on particles of the pre-processed salt composition. Accordingly, there is high uniformity of particle size and density in the components of the final product, with resulting high uniformity and stability of iodide content. The final product consists of a highly uniform mixture of stabilizer-iodide coated particles and uncoated particles of the pre-processed salt composition which have substantially equal densities.

Accurate control of the iodine content of the final product is maintained by controlling the strength and amount of the stabilized iodide solution which is sprayed onto the moving body or stream of the pre-processed salt, and by controlling the rate at which the salt mass or stream moves past the solution spray.

A stable iodized salt composition having a highly uniform iodine content may be prepared in accordance with the principles of this invention by charging about 80 pounds of crystals of hydrated sodium thiosulphate, about 8 pounds of potassium iodide, in the form of a free flowing powder, for example, and about ½ pound of caustic soda into a mixing and dissolving vessel to which heat is supplied through a heating device such as a steam jacket or electric heating coil. Sufficient heat is supplied to the mixing and dissolving vessel to liberate the water of crystallization or hydration from the sodium thiosulphate in sufficient quantity to dissolve therein all the sodium thiosulphate, which is highly soluble, and all the potassium iodide and caustic soda. As sodium thiosulphate liberates its water of crystallization or hydration at about 48° C. (102° F.) sufficient heat is supplied to raise and maintain the temperature of the mixture in the vessel above this value. The contents of the vessel are advantageously stirred and mixed as the dissolving process proceeds to provide a uniform solution of the potassium iodide and sodium thiosulphate.

The solution of this stabilizer-iodide mixture is sprayed under pressure through a nozzle onto a moving mass or stream of a pre-processed salt composition such as table salt. The solution is maintained at a temperature sufficient to prevent re-crystallization before passing through the spray nozzle and other conduits and before being sprayed onto the moving mass of pre-processed salt. For example, the solution may be maintained at a value of about 180° F. By moving the salt mass past the solution spray at an elevated temperature between 125° F. and 190° F., the iodide solution is crystallized on particles of the salt composition without lumping, and by maintaining the body of the spraying salt in a warm condition, the sprayed or coated particles are readily mixed with the unsprayed or uncoated particles. Such mixing may be effected simultaneously with or subsequently to the spraying of the solution onto the salt composition, as for example, by spraying the stabilized iodide solution onto the entire mass of pre-processed salt at one or more locations as the salt moves through a screw conveyor to a storage bin or packaging machine.

The terms "coated" and "coating" as employed herein are not limited to describing only particles or crystals of salt which are entirely coated with the crystallized stabilizer iodide mixture, but also describes particles or crystals which have only a portion of their surface coated with such crystallized mixture.

If the filler or agent which imparts free-flowing qualities to the pre-processed salt is sufficiently alkaline to prevent decomposition of the potassium iodide, no caustic soda need be included in making up the solution.

The rate at which the preprocessed salt is moved past the solution spray may be varied to provide different proportions of available iodine in the final product. A desirable product results from spraying a stabilizer-iodide solution such as that described above onto a moving mass of pre-processed salt which moves past the spray in a stream, as for example through a screw conveyor, at the rate of about 10 tons per hour, the solution being sprayed onto the salt under a pressure of about 35 pounds per square inch through a nozzle having an orifice diameter of about 0.028 inch. Under such conditions the 88 pound mixture of the stabilizer-iodide solution composed as described above, treats 40 tons of pre-processed salt to provide a final product having a uniformly distributed iodide content of about 0.01%.

Under the same conditions a nozzle of 0.04 inch with 22 pounds per square inch will give like results.

Products prepared in accordance with this invention have a highly uniform iodide content, are stable and entirely free of iodide dust, have the iodide contained therein uniformly and effectively stabilized, and are uniformly mixed, dry, free flowing products which require no additional grinding, drying or mixing prior to being packaged. The method of this invention provides accurate and precise control of the iodide content of the final product, eliminates the heretofore employed mixing methods and also eliminates the dusting, sifting off or settling out of the iodide as encountered in previously employed processes.

Sodium thiosulphate has been described as a suitable stabilizer. Various other sulphites could be employed, such as sodium sulphite and sodium bisulphite, and sodium phosphite may also be employed.

Although the example of a specific product prepared in accordance with this invention has been described with reference to a specific stabilizer-iodide solution, and although certain specific conditions have been stated under which, according to this invention, a satisfactory product may be prepared, variations which will be apparent to those skilled in the art may be made as to the mineral material being iodized, the composition of the iodide solution and the manner of applying the solution to the mineral material, without departing from the principles and scope of the invention.

We claim:

1. A mineral composition comprising a physical mixture of particles of finely-divided pre-processed salt with particles of such pre-processed salt which have a coating of a uniform intimate mixture of an alkaline iodide and a stabilizer therefor crystallized in situ thereon.

2. A mineral composition comprising a physical mixture of particles of finely-divided pre-processed salt with particles of such pre-processsed salt which have a coating of a uniform intimate mixture of an alkaline iodide and a hydrated stabilizer therefor crystallized thereon from a solution containing the alkaline iodide, the stabilizer and only the water of crystallization of the stabilizer.

3. A stable iodized salt composition comprising a physical mixture of particles of finely-divided pre-processed salt with particles of such pre-processed salt which have a coating of a uniform intimate mixture of potassium iodide and hydrated sodium thiosulphate crystallized in situ thereon.

4. A stable iodized salt composition comprising a physical mixture of particles of finely-divided pre-processed salt with particles of such pre-processed salt which have a coating of a uniform intimate mixture of potassium iodide and hydrated sodium thiosulphate crystallized thereon from a solution containing potassium iodide, sodium thiosulphate and only the water of crystallization of the sodium thiosulphate.

5. A stable iodized salt composition as defined in claim 4, in which the final mixture contains about 0.01% of potassium iodide.

6. A stable iodized salt composition comprising a physical mixture of particles of finely-divided pre-processed salt with particles of such pre-processed salt which have a coating of a uniform intimate mixture of potassium iodide and hydrated sodium thiosulphate crystallized thereon from a solution containing potassium iodide, sodium thiosulphate and only the water of crystallization of the sodium thiosulphate, the particles carrying the crystallized mixture being uniformly distributed throughout the mass of the resulting salt composition.

7. A stable iodized salt composition comprising a physical mixture of particles of finely-divided pre-processed salt with particles of such pre-processed salt which have a coating of a uniform intimate mixture of an alkaline iodide and a stabilizer therefor crystallized in situ thereon, the coated and uncoated particles having substantially equal densities.

8. A stable iodized salt composition comprising particles of finely-divided pre-processed salt which have a coating including an alkaline iodide and a stabilizer for said iodide intimately and uniformly distributed in said iodide crystallized in situ thereon.

9. A stable iodized salt composition comprising particles of finely-divided pre-processed salt which have a coating comprising an alkaline iodide and sodium thiosulphate intimately and uniformly distributed in said iodide crystallized in situ thereon.

10. The process of making a stable iodized salt composition which comprises depositing on crystals of a finely-divided pre-processed salt a coating of a uniformly mixed solution of an alkaline iodide and a hydrated stabilizer therefor and containing only the water of crystallization of the stabilizer, and thoroughly mixing the coated and uncoated particles of said pre-processed salt.

11. The process of making a stable iodized salt composition which comprises depositing on crystals of a finely-divided pre-processed salt a coating of a uniformly mixed solution of an alkaline iodide and a hydrated stabilizer therefor and containing only the water of crystallization of the stabilizer.

12. The process of making a stable iodized salt composition which comprises depositing on crystals of finely-divided salt a coating of a uniformly mixed solution of potassium iodide and sodium thiosulphate and containing only the water of crystallization of the sodium thiosulphate, and thoroughly mixing such coated salt crystals with uncoated salt crystals.

13. The process of making a stable iodized salt composition which comprises depositing on crystals of finely-divided salt a coating of a uniformly mixed solution of potassium iodide and sodium thiosulphate and containing only the water of crystallization of the sodium thiosulphate.

14. The process of making a stable iodized salt composition which comprises continuously moving a mass of a finely-divided pre-processed salt composition through a predetermined path forming a coating of intimately and uniformly mixed alkaline iodide and stabilizer therefor on some of said salt by continuously spraying said moving mass with a solution in water of said alkaline iodide and said stabilizer therefor and continuously mixing the sprayed particles with the unsprayed particles of said salt composition.

15. The process of making a stable iodized salt composition which comprises spraying a mass of finely-divided pre-processed salt with a solution of potassium iodide and sodium thiosulphate containing only the water of crystallization of the sodium thiosulphate, and thoroughly mixing such sprayed salt particles with the unsprayed salt particles.

16. The process as defined in claim 15, and including the step of moving said mass of finely-divided pre-processed salt relative to the solution spray during the spraying operation.

17. The process as defined in claim 15, and including the step of moving said mass of finely-divided pre-processed salt in one direction past the solution spray during the spraying operation.

18. The process as defined in claim 15, and including the steps of moving said mass of finely-divided pre-processed salt in one direction past the solution spray during the spraying operation, and controlling the amount of solution sprayed onto said pre-processed salt mass to provide about 0.01% of potassium iodide in the final composition.

19. In a process for iodizing a finely-divided pre-processed salt composition, the steps of spraying particles of said composition with a uniform liquid mixture of potassium iodide and sodium thiosulphate which contains only the water of crystallization of the sodium thiosulphate, and mixing such coated particles with the uncoated particles of said composition.

20. In a process for iodizing a finely-divided pre-processed salt composition, the steps of spraying particles of said composition with a mixture of potassium iodide and sodium thiosulphate which contains only the water of crystallization of the sodium thiosulphate, crystallizing such sprayed mixture on said salt particles, and mixing said sprayed salt particles with the unsprayed salt particles.

21. In a process for iodizing a finely-divided pre-processed salt composition, the steps of crystallizing on particles of said composition a mixture of potassium iodide and sodium thiosulphate from a liquid solution containing only the water of crystallization of the sodium thiosulphate, and mixing said salt particles with the other particles of said composition.

22. The process of making a stable iodized salt composition which comprises depositing on crystals of a finely-divided pre-processed salt a coating of a uniformly mixed solution of an alkaline iodide and a hydrated material and containing only the water of crystallization of the material, and thoroughly mixing the coated and uncoated particles of said pre-processed salt.

23. The process of making a stable iodized salt composition which comprises depositing on crystals of a finely-divided pre-processed salt a coating of a uniformly mixed solution of an alkaline iodide and a hydrated material and containing only the water of crystallization of the material.

PAUL V. IMES.
CHARLES W. JOBES.

REFERENCES CITED

The following references are of record in the file of this patent:

UNITED STATES PATENTS

| Number | Name | Date |
|---|---|---|
| 2,104,619 | Lehmann | Jan. 4, 1938 |
| 2,144,150 | Hart et al. | Jan. 17, 1939 |
| 2,205,872 | Berry | June 25, 1940 |